United States Patent [19]

Winkler et al.

[11] Patent Number: 4,932,118
[45] Date of Patent: Jun. 12, 1990

[54] MACHINE TOOL

[75] Inventors: Hans-Henning Winkler, Tuttlingen; Eugen Rütschle, Mühlheim, both of Fed. Rep. of Germany

[73] Assignee: Chiron-Werke GmbH & Co. KG, Tuttlingen, Fed. Rep. of Germany

[21] Appl. No.: 408,977

[22] Filed: Sep. 18, 1989

[30] Foreign Application Priority Data

Sep. 20, 1988 [DE] Fed. Rep. of Germany ....... 3831869

[51] Int. Cl.⁵ .......................................... B23Q 3/157
[52] U.S. Cl. .................................................... 29/568
[58] Field of Search .............. 29/568, 26 A; 408/236; 414/730, 735, 738, 744.2, 744.4

[56] References Cited

U.S. PATENT DOCUMENTS 4,557,035 12/1985 Rutschle et al. ...................... 29/568
4,683,638 7/1987 Winkler et al. ....................... 29/568

FOREIGN PATENT DOCUMENTS

265710 5/1988 European Pat. Off. ............. 29/568
1552324 7/1966 Fed. Rep. of Germany .
2013836 3/1970 Fed. Rep. of Germany .
2211123 10/1972 Fed. Rep. of Germany ........ 29/568
2198375 6/1988 United Kingdom ................. 29/568

Primary Examiner—William Briggs
Attorney, Agent, or Firm—Rosenblum, Parish & Bacigalupi

[57] ABSTRACT

A machine tool comprises a spindle stock (12), a tool magazine (20) in which a plurality of grippers equipped with tool holders are arranged to travel along an endless track, and two gripper arms (25, 26; 28, 29) arranged for moving the tool holders between a common pick-up and/or mounting position at the tool magazine and a spindle position at the spindle nose of the spindle stock (12), which has a vertical spindle axis (23, 24). In order to achieve the narrowest possible arrangement for the transfer movement between the pick-up and mounting position and the spindle position, it is provided that both gripper arms (25, 26; 28, 29) operate simultaneously and in opposite directions between their spindle positions and their pick-up and/or mounting positions, which are located on one side of the spindle stock (12), moving along geographical curves evading each other.

19 Claims, 8 Drawing Sheets

MACHINE TOOL

The present invention relates to a machine tool comprising a spindle stock, a tool magazine in which a plurality of grippers equipped with tool holders are arranged to travel along an endless track, and two gripper arms arranged for moving the tool holders between a common pick-up and/or mounting position at the tool magazine and a spindle position at the spindle nose of the spindle stock, the gripper arms being pivoted on opposite sides of one axis of the spindle stock, beside the spindle stock, and arranged for being pivoted simultaneously and in opposite directions between their spindle position and their pick-up and/or mounting position. DE-PS No. 20 13 836 and DE-AS No. 15 52 324 describe machine tools with tool-changing devices comprising a pair of gripper arms arranged for transferring, by alternating movements, a tool holder between a tool magazine and a tool holding fixture of the spindle stock. The arrangement is such that both gripper arms of the pair of gripper arms are assigned to the same mounting-/pick-up position of the tool magazine. However, the two gripper arms are of identical, but mirror-symmetrical design and they also move symmetrically, but in opposite senses, relative to the spindle axis and/or one point of such axis.

The two known machine tools, therefore, are connected with the disadvantage that due to the symmetrical motion sequence of the two gripper arms of each pair of gripper arms, which are arranged laterally of the spindle axis, a considerable clearance must be available on both sides of the spindle axis to permit such gripper arm movements.

In the case of another machine tool, which has been known from U.S. Pat. No. 4,683,638 the magazine is designed in the form of a U or a horseshoe, and the pick-up and/or mounting position is provided on both ends of the legs of the U. The spindle head is arranged in front of and below these ends. The gripper arms operate on opposite sides of the spindle stock so that when the one arm with its tool holder occupies the lower spindle position, the other arm is pivoted laterally in such a manner that its tool holder occupies the pick-up and/or mounting position at one end of the horseshoe-type magazine. During the tool change, the one arm, whose tool holder has picked up a tool at the one end of the horseshoe-type magazine, is moved toward the spindle stock, in the direction of its spindle position. At the same time, the other arm, whose tool holder occupied the spindle position, is moved oppositely to the other arm, away from the spindle head and toward the other opposite end of the horseshoe-type magazine in order to transfer to the magazine the tool that has been picked up from the spindle head. Although the known machine tool enables the tool to be picked up very rapidly, it is a drawback of such machines that they necessarily exhibit a considerable width on both sides of the spindle stock as sufficient space must be available left and right of the spindle stock for the pivoting movements of each arm.

In many cases it is desirable, in particular for large-series production purposes, to provide a machine tool with a plurality of spindle stocks arranged side by side and to accommodate them within very narrow space. In the case of a machine of the type described above, the minimum space between two spindle heads would have to be twice the maximum lateral width of movement of a pivoting arm. This would result in a machine of very large width, for example in the case of a double-spindle machine. Further, it is desirable in connection with double spindle stocks to provide a single drive for both spindle heads. However, if the spindle heads are spaced a great distance, the long power-transmission paths may lead to vibrations and unsteady running conditions so that the machine tools would have to be made very solid and, consequently, heavy in order to overcome these problems. Consequently, such a machine tool would be not only very large in width, but also excessively heavy.

Now, it is the object of the present invention to improve a machine tool of the type described above so that only little lateral space is required by the components performing the tool change, while ensuring at the same time minimum tool-changing times. This also means that a machine tool with double spindle stock can be implemented with only little distance between the spindle axes.

This object is achieved according to the invention by the fact that the gripper arms can be moved by a crossing pivoting movement to the common pick-up and/or mounting position located on one side of the spindle stock, in asymmetrical arrangement relative to the axis, along paths extending on one side only of the spindle stock.

These features provide the advantage that both swinging arms move between the spindle position and one and the same pick-up and/or mounting position. This means that when one arm, together with its tool holder, moves away from the spindle head and laterally toward the magazine, the other arm will move simultaneously in opposite direction, from the magazine toward the spindle head. By designing the paths of movement in such a manner that they evade each other, but meet at their ends, the arms can be moved past each other without the arms, or the tool holders and the tools carried by them, interfering with each other. Consequently, the space, i.e. the width, required by the swinging arms is now only half that needed in the case of the machine tools mentioned at the outset. The transport movement is limited to one side of the spindle stock or the spindle axis, viewed from the axis of the spindle stock. The described feature further provides the advantage that the spindle stock is freely accessible from one side, i.e. unobstructed by the swinging arms or the magazine. This facilitates, for example, the performance of maintenance and repair work. In addition, the described feature provides the advantage that in the event the spindle stock can be displaced in transverse direction, it can be moved right up to the machine housing, if any, in a lateral direction opposite to the swinging arms. It is thereby rendered possible, for example, to process larger workpieces with machine tools of the same outer dimensions.

According to another embodiment of the invention, the spindle stock is designed as double spindle stock comprising two spindles, each of the spindles being provided with a pair of two gripper arms and the common pick-up and/or mounting position of each pair being located at the side of the spindle opposite the other spindle.

This feature provides the advantage that it is now possible to create a double spindle stock which exhibits only a very small lateral width.

According to one advantageous embodiment of the invention, each gripper arm is pivoted, at its machine end, on an element of the spindle stock and adapted for being pivoted between its end positions, and each such element of the spindle stock can be pivoted about an additional axis so that the swinging arms, moving in opposite directions, can pass each other without getting into contact with each other.

This feature provides the advantage that the gripper arms can perform their pivoting movement between their end positions and, at the same time, be pivoted during the movement in an additional direction in space so as to avoid any interference with each other, and all this by simple constructional means. By superimposing the pivoting movement of the element of the spindle stock about the additional axis, and the swinging movement of the gripper arms which are pivoted on that element, it has become possible in a simple manner to produce a desirable path of movement which can be adapted very simply to the dimensions of the particular tool holder and/or the tool mounted therein.

According to a preferred embodiment of the invention, each gripper arm is pivoted on one element of the spindle stock so as to swing about an axis extending substantially perpendicularly to the vertical spindle axis, and the additional axis extends in vertical direction.

This feature provides the advantage that the swinging arms can perform an additional movement between the end positions, such movement taking place substantially in front of the end face of the spindle stock. By permitting the pivoted member to swing about a vertical axis it is possible to control the additional pivoting movement from the spindle stock, by simple constructional means, without the need to implement space consuming measures which might even hinder or impair the swinging movement. By incorporating the vertical pivot axes of the swinging elements into the spindle stock solid and precise guiding of the swinging arms can be ensured, in spite of the additional swinging freedom.

According to another preferred embodiment of the invention, an actuating element controlling the swinging movement of the arms serves at the same time for actuating the swinging element.

This feature provides the advantage that the two pivoting movements can be controlled by one and the same element, by very simple constructional means. This leads to a design of little complexity, in spite of the necessity to provide a second pivoting movement.

According to another, particularly preferred embodiment of the invention, the actuating element is connected with a cam element which can be moved up and down on the spindle stock along a vertical axis, and the cam element is connected with a swinging element, via another element running along a groove in the cam element, so that any upward or downward movement of the cam element will cause the swinging elements to swing in opposite directions, from a rest position to a maximum and then back into the rest position.

This feature provides the advantage that the cam element enables the pivoting movement of the swinging element to be controlled precisely. Due to the fact that the swinging elements move in opposite directions, they have to be pivoted only about a relatively small angle in order to clear the necessary distance, at the end of the gripper arms carrying the tool holders, for permitting such ends to move past each other. In addition, this arrangement ensures that in their respective end positions the two tool holders will nevertheless exactly assume the position which the gripper arm or its tool holder, which was previously moved out of this position, had occupied.

According to a particularly preferred embodiment of the invention, the contours of the grooves are designed in such a manner that the maximum of the pivoting movement of the swinging element corresponds to the position in which the tool holders of the oppositely directed arms move past each other.

This feature provides the advantage that the necessary maximum distance between the arms is provided at that point where the tool holders, which project relatively far to the side, meet and pass each other. This permits the use of grippers which protrude relatively far, for example those commercially available. On their way between the end positions, the tools move along oppositely directed curved paths which have their maximum distance exactly at the point where the tools meet. This point is located substantially midway between the spindle position and the tool magazine (or pick-up and/or mounting position), i.e. a point which is occupied neither by the spindle stock nor by the magazine, so that sufficient space is available for the two grippers of the gripper arms to meet and to pass, without the need to provide additional space either at the spindle stock or at the magazine.

According to another particularly preferred embodiment of the invention, the swinging element is designed as a plateshaped body with an arm pivoted on its outside, and the body is provided with an outwardly projecting rod carrying on its outer end a protruding element which runs in the groove of the cam element thereby causing the rod to pivot about its longitudinal axis. This feature provides the advantage that the evading movement of the arms can be controlled by simple constructional measures and that at the same time the movement is exactly guided. In addition, these components can be exchanged easily, i.e. adapted to varying tool sizes or widths, if this should become necessary, and accordingly to varying lateral clearances needed for the arms moving past each other.

According to another embodiment of the invention, the rod is held in the spindle stock in axially fixed relationship, but permitted to pivot about its longitudinal axis, in the area between the plate-shaped body and the protruding element.

This feature provides the advantage that the rod can be held extremely firmly and guided very efficiently in the solid spindle stock so that solid mounting of the plate-like bodies carrying the gripper arms is ensured, even in the case of extremely heavy tools and of gripper arms projecting very far.

According to another embodiment of the invention, the cam element is connected with two arms, via two rods pivoted on either side of the cam element, so that any movement of the cam element in one direction, between two vertical end positions, will cause the arms to swing in the opposite direction, between their end positions, and that the rod is caused to follow the pivoting movement of the swinging element.

This feature provides the advantage that the cam element controls on the one hand, via the rods, the swinging movement of the arms between their end positions and on the other hand, via the protruding elements of the rods running in the groove of the cam element, the pivoting movement permitting the tools to pass each other. Each rod is mounted on the cam element to pivot in two directions in space and accordingly capable of following the pivoting movements of the arms in all pivoting directions.

According to another embodiment of the invention, the one rod is pivotally connected with a first arm, which takes the form of a one-armed lever, at a point between its lever axis and its outer end carrying a gripper, while the other rod is pivotally connected with the outer end of a second arm, which is designed as two-armed lever, and which carries a gripper at its other outer end.

This feature provides the advantage that, for example, a downwardly directed movement of the cam element ensures that the first arm is pivoted downwardly, while the second arm is pivoted upwardly. It is thus rendered possible, by particularly robust and simple means, to generate the oppositely directed movements of the two arms by a single control element moving in only one direction, i.e. by the movement of the cam element.

According to another embodiment of the invention, each arm is provided with a parallelogram guide. This conventional measure ensures that the tool holder, with the tool mounted thereon, retains its vertical alignment in any pivotal position.

According to another advantageous embodiment of the invention, the actuating element is designed as a vertical-stroke piston-and-cylinder unit which has the outer end of its piston rod connected with the cam element. This particularly simple design and robust and, thus, safe and exactly guiding embodiment ensures that the necessary power transmission to the gripper arms is established by the actuating element, via the cam element.

According to another embodiment of the invention, the actuating element comprises two piston-and-cylinder units arranged symmetrically to the spindle axis, the cam element and, below the latter, the elements to be pivoted being enclosed between them, and that the rods connected with the cam element likewise extend symmetrically to the spindle axis.

The fact that two piston-and-cylinder units are arranged on either side of the spindle axis excludes any tilting during the movement along the spindle axis. The arrangement of the control elements between and below the piston-and-cylinder units provides the possibility to arrange the actuating and control elements for the pivoting movement at an extremely convenient point on the end face of the spindle stock so that the area of the spindle head remains freely accessible, or is obstructed only temporarily by the gripper arms during their pivoting movement. The vertically guided arrangement of the piston-and-cylinder unit, as well as the vertical arrangement of the rods, lead to a compact, rigid, and distortion-free mechanism which ensures permanent exact operation of the tool-changing process.

According to another embodiment of the invention, the endless track of the tool magazine is designed in T shape, and can be displaced in a plane vertical to the vertical axis and above the spindle position, the pick-up and/or mounting position being located at the lower end of the T.

This feature provides the advantage that the magazine can be located very closely, laterally, to the spindle stock. The section of the T-shaped endless track extending in transverse direction may then be located on the rear side, behind the spindle stock.

According to another embodiment of the invention, each spindle has assigned to it a tool magazine with a T-shaped endless track.

This feature provides the advantage that two neighboring spindles, arranged very closely to each other, can be supplied with changing tools. The mirror-symmetrical arrangement of the two gripper pairs makes it possible to arrange the two spindles relatively close to each other so that the two spindles can be moved by a single drive, without great technical input and without the risk of vibrations due to long power transmission paths. The lateral extension of this double spindle corresponds approximately to that of a conventional single spindle with arms mounted on both sides to swing in opposite directions, which means that it has become possible, by providing two spindles that can be supplied rapidly with the necessary tools, to double the working speed of a machine with approximately the same width.

According to another embodiment of the invention, two endless tracks can be operated via a single drive, by means of a belt element whose path crosses once.

This feature provides the advantage that two identical workpieces can be processed simultaneously by the two spindles with similar tools, and that when the T-shaped endless tracks are equipped in mirror-symmetrical arrangement, any movement of the belt element generated by a single drive will provoke an identically directed transport movement in both T-shaped endless tracks, which means that two identical tools will be transferred to the pick-up and/or mounting position in the two endless T tracks. The tools are then picked up simultaneously by one arm each of the two gripper pairs and transported in synchronism to one spindle each, where due to the common spindle drive two identical operating processes can be carried out in synchronism on two different workpieces. This makes it possible to double the output of a machine tool, with only one common drive for both spindles and one common drive for the two T-shaped endless tracks of the tool magazines. Another advantage of this feature is seen in the fact that the tool change is simplified in cases where the magazine has to be charged with tool holders before commencement of a new production process, and to be unloaded again after completion of the production process.

Due to the oppositely driven endless tracks the tool holders appearing in that area where the two horizontal sections of the T-shaped endless tracks adjoin each other, will always be identical so that they may even be charged into the magazine or unloaded from the latter in pairs; and this in turn reduces the risk of errors during charging of the magazines.

According to another embodiment of the invention, the T-shaped magazines adjoin each other behind the main spindle stock by opposite outer ends of the transverse sections of the Ts, and the magazines are accommodated in a continuous magazine housing.

This feature provides the advantage that the two T-shaped endless tracks can be accommodated in a single tool magazine extending over the whole rear face of the main spindle stock, thereby filling a space which is freely available for this purpose, without any obstruction.

According to another embodiment of the invention, the endless track of the tool magazine is designed in horseshoe shape, the pick-up and/or mounting position being located at a free end of one of the legs of the horseshoe.

This feature provides the advantage that the machine tool according to the invention can be equipped also with tool magazines of the type known in the art as so-called "horseshoe magazines".

It is understood that the features that have been described before and will be explained hereafter may be used not only in the described combinations, but also in any other combination, or individually, without leaving the scope and intent of the present invention.

The invention will now be described and explained in more detail by way of some selected embodiments, with reference to the attached drawings in which.

Figure 1:
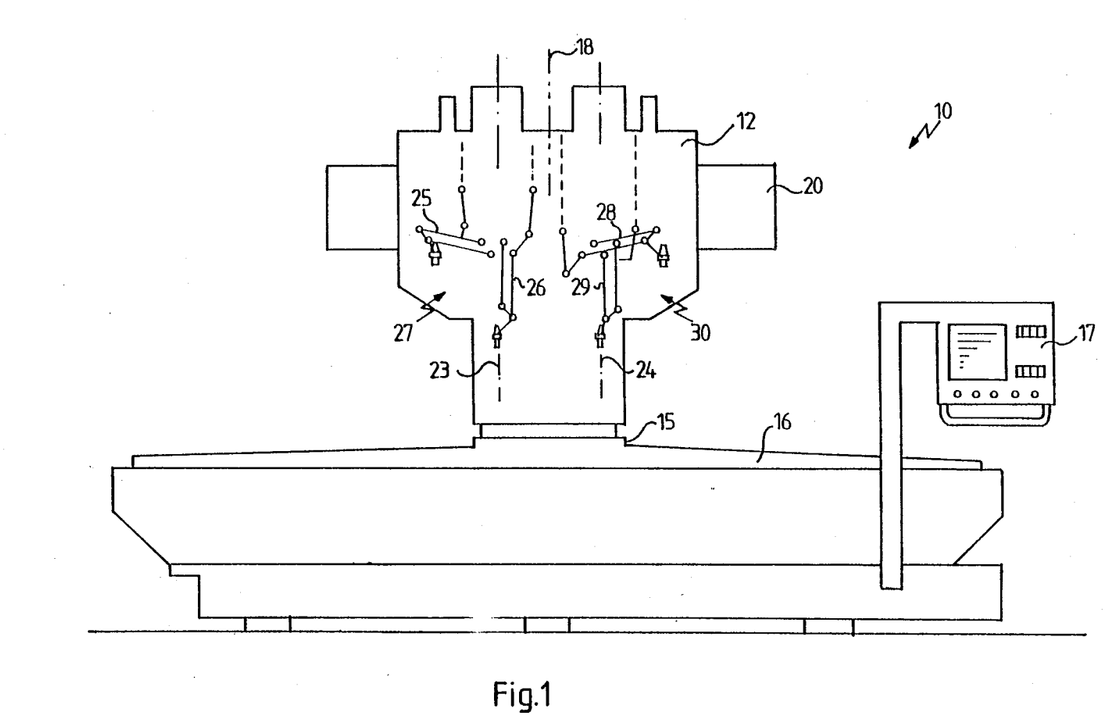
FIG. 1 shows a very diagrammatic front view of a machine tool according to the invention.
Figure 2:
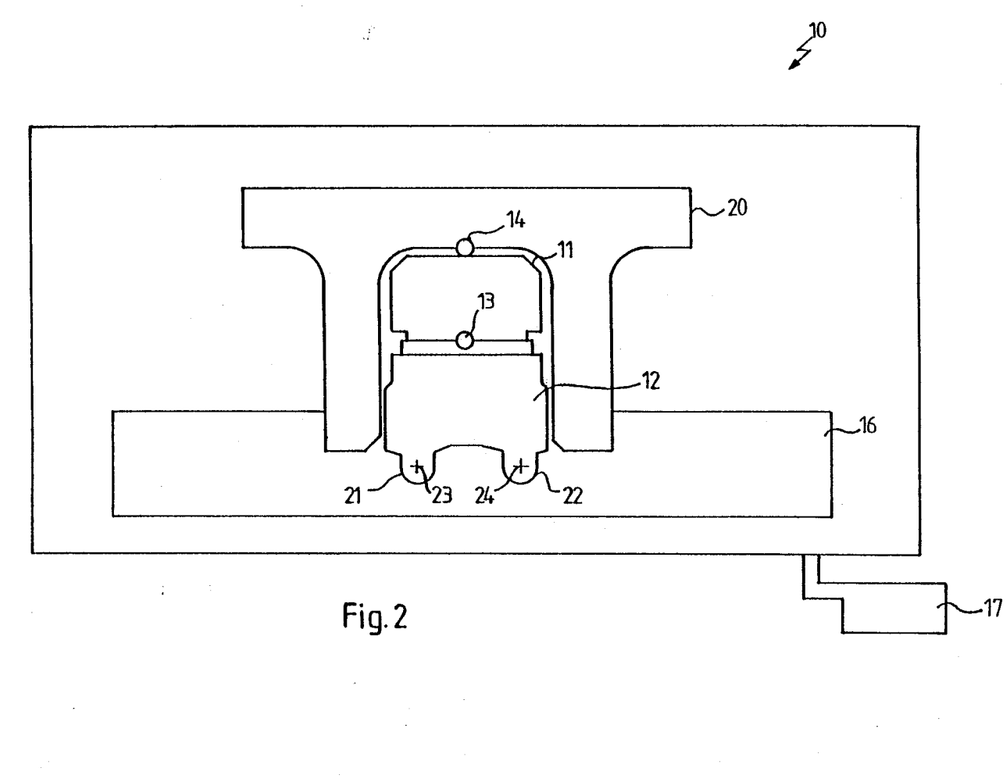
FIG. 2 shows a top view of the machine tool of FIG. 1.

In FIGS. 1 and 2, a machine tool designated generally by reference numeral 10 comprises a spindle stock 12 which can be displaced in height by means of a main elevating screw 13 (FIG. 2) arranged at the rear of the spindle stock 12. The main elevating screw 13 is seated in a supporting block 11 which, for the sake of greater stability, is equipped at the rear with a secondary elevating screw 14.

The spindle stock 12 is supported on a base 15 which can be displaced horizontally (X, Y axis) in a machine bed 16.

Further, the machine tool 10 is equipped with a control desk 17 serving to control the functions of the machine tool. The machine is provided with a housing—not shown in the drawing—which serves to retain the chips produced and/or to prevent the drilling coolant from splashing around during the machining operation.

The upper end portion of the spindle stock 12 is embraced by a tool magazine 20 extending along the sides and the rear of the spindle stock 12 and/or the supporting block 11. The tool magazine 20 will be described in more detail further below, with reference to FIG. 13.

The front or end face of the spindle stock 12 is equipped with a first spindle 21 and a second spindle 22 adapted for receiving tool holders. A first spindle axis 23 of the first spindle 21 and a second spindle axis 24 of the second spindle 22 (see FIG. 2) extend in vertical direction at a certain distance to each other, with the axis 18 of the main elevating screw 13 arranged between the spindle axes 23 and 24, viewed from the front (FIG. 2).

A plane extending through the axis 18 and perpendicularly to the drawing plane of FIG. 1, divides the spindle stock 12 in two mirror-symmetrical spindle stock halves.

As viewed in FIG. 1, the left half of the spindle stock 12 carries two gripper arms 25 and 26 forming a first pair of grippers 27.

The right half of the spindle stock 12 is equipped with a gripper arm 28 and a gripper arm 29 forming together a second pair of gripper arms 12.

Each pair of gripper arms 27, 30 is pivoted on both sides of its respective spindle axis 23, 24. However, the gripper arms 25, 26 and 28, 29, respectively, of each pair of gripper arms 27, 30 are different in design and also as regards their motion sequence, which is asymmetrical relative to the respective spindle axis 23, 24.

Figure 3:
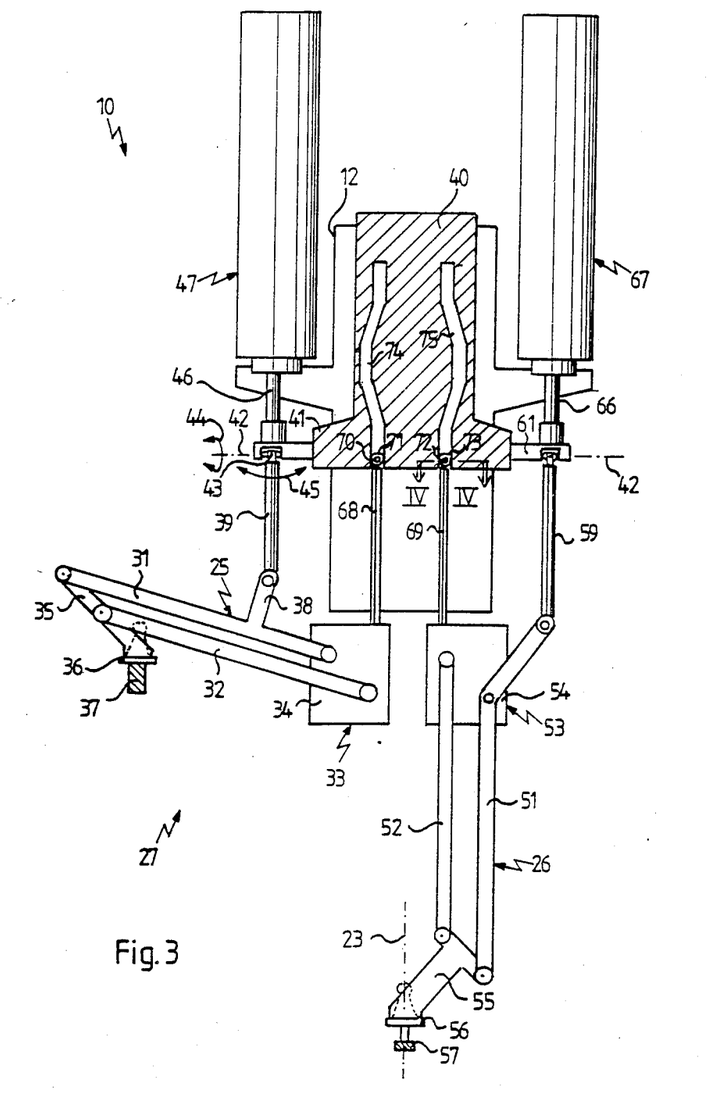
FIG. 3 shows a detailed partial front view of the machine tool according to FIG. 1.

In FIG. 3, the first pair of gripper arms 27, arranged on the left half of the spindle stock 12 in FIG. 1, is shown in enlarged scale. For the sake of clarity, only the operating components which will be described hereafter in connection with the motion sequence of the first pair of gripper arms 27 are shown in the drawing. The position of the gripper arms 25 and 26 illustrated in FIG. 3 corresponds to the representation, i.e. the position shown in the left half of FIG. 1.

Hereafter, the control and pivoting mechanism of the gripper arms 25 and 26 will be explained in more detail. The constructional design as well as the motion sequence of the first pair of gripper arms 27 formed by the gripper arms 25/26 are the same as for the second pair of gripper arms 30, except that their arrangement is mirror-symmetrical relative to the dividing plane extending through the axis 18. Consequently, the following detailed description referring to the first pair of gripper arms 27 will be valid correspondingly also for the second pair of gripper arms 30.

The first gripper arm 25 comprises a first rod 31 and a second rod 32 which are both pivoted on a swinging element 33 in the form of a plate 34 or a plate-shaped body. The rods 31 and 32 can be pivoted about axes passing through their pivot points and extending perpendicularly relative to the plate 34.

The outer ends of the rods 31 and 32, i.e. their ends opposite the plate 34, are articulated on a rod 35 carrying a gripper 36 which is adapted to receive a tool holder 37. The rods 31 and 32 are pivoted on the plate 34 and/or the rod 35 in such a manner that a parallelogram-like linkage is obtained.

This has the result, which is known as such, that as the first pair of gripper arms 27 is pivoted about its pivot points at the plate 34, the gripper 36, together with the tool holder 37, will always retain their horizontal alignment.

In the position shown in FIG. 3, the gripper 36, together with the tool holder 37 mounted therein, occupies its so-called pick-up and/or mounting position which corresponds to one end position of the first pair of gripper arms 27.

In this end position, the tool holder 37 can be removed and transferred to the magazines 20 by mechanisms known as such. Thereafter, a tool holder with another tool can be transferred from the tool magazine 20 to the gripper 36 of the first pair of gripper arms 27, which means that the tool can be exchanged.

The upper rod 31, which is designed as a one-armed lever, is provided, in the area between its outer pivoted ends, with a projection 38 which extends substantially perpendicularly from the rod 31 and which is connected with the bar 39 by sort of a ball joint.

The opposite end of the rod 39 is connected with a lateral projection 41 of a com element 40, likewise by sort of a ball joint. The connection achieved by this arrangement is such that the rod 39 can be pivoted about an axis 42, as indicated by arrow 44. In addition, the rod 39 can be pivoted about an axis 43 extending perpendicularly to the axis 42, as indicated by arrow 45.

Consequently, the rod 39 is capable of following a circular path—extending in the plane of the drawing—of its point of connection with the extension 38, and also of following swinging movements of the first pair of gripper arms 27 directed out of the plane of the drawing, for example toward an observer.

The upside of the lateral projection 41 of the cam element 40, i.e. the side opposite the point of connection with the bar 39, is connected with the outer end of a piston rod 46 of a piston-and-cylinder unit 47. The piston-and-cylinder unit 47 in turn is rigidly connected with a sleeve arranged on the spindle stock 12. The longitudinal axis of the piston-and-cylinder unit 47 extends in parallel to the vertical axis 18 and/or to the vertical axis 23 of the first spindle 21.

The second gripper arm 26 of the first pair of gripper arms 27 comprises a rod 51 designed as a two-armed lever. The rod 51 is articulated, at the point of its lever axis, on an element 53 of the spindle stock 12 which is arranged for being pivoted and which has been described above as plate 54 or plate-shaped body, in connection with the description of the element 33. The plate 54 is arranged at the same height as the plate 34, and in the pivoted condition the planes of the two plates 54 and 34 extend in the same plane. The pivot point of the rod 51, i.e. the two-armed lever, on the plate 54 is located in one level with the pivot point of the rod 32 on the plate 34.

The gripper arm 26 comprises further a rod 52 which is likewise pivoted on the plate 54 to swing about an axis extending perpendicularly to the drawing plane. The pivot point of the rod 52 on the plate 54 is located at the same level as the pivot point of the rod 31 of the gripper arm 27 on the plate 34. Regarding, however, the rods 31 and 52 with the higher pivot point, the rod 31 of the left gripper arm 25 is located outwardly, the rod 52 of the right gripper arm 26 inwardly, related to the plane of symmetry between the two gripper arms 25, 26.

The outer ends of the rods 51 and 52, opposite the plate 54, are interconnected by a rod 55 provided with a gripper 56 which carries a tool holder 57. The rods 51, 52 also form a parallelogram-like linkage which ensures that when the gripper arm 26 is pivoted about its pivot points on the plate 54, the gripper 56, together with the tool holder 57 carried by it, will retain its horizontal and/or vertical alignment.

In the condition illustrated in FIG. 3 (and also in FIG. 1), the gripper arm 26 occupies its so-called spindle position corresponding to one end position of the gripper arm 26. The longitudinal center axis of the tool holder 57 carried by the gripper 56 coincides in this condition exactly with the first spindle axis 23 of the first spindle 21.

The gripper 56 is provided with a swivel bearing for the tool holder 57, which means that once the tool holder 57 has been mounted in the spindle head of the first spindle 21, the gripper 56 will remain connected with the tool holder 57 during the machining process. The force-locking connection between the tool holder 57 and the spindle head is effected by lowering the spindle head from above upon the tool holder 57, by a movement relative to the sleeve. A conventional bent-off arrangement of the gripper 55 ensures that the area of the spindle head, which is not shown in detail in the drawing, of the first spindle 21 remains freely accessible and remains unobstructed by the rods 51, 52, 55.

The outer end of the two-armed rod 51, opposite the rod 55, is connected with a rod 59 by sort of a ball joint. The opposite end of the rod 59 is connected with a lateral projection 61 of the cam element 40 by sort of a ball joint, i.e. so as to pivot about two geometrical axes, in the same manner which has been described before for the rod 39. The lateral projection 61 is arranged at the same level, and also on the same axis 44, as the oppositely directed lateral projection 41.

The upside of the lateral projection 61, opposite the pivot point of the rod 59, is connected with the outer end of a piston rod 66 of a piston-and-cylinder unit 67.

The piston-and-cylinder unit 67 is connected rigidly with a sleeve mounted on the spindle stock 12. The longitudinal axis of the piston-and-cylinder unit 67 extends vertically, i.e. in parallel and at a certain distance from the longitudinal axis of the opposite piston-and-cylinder unit 47. The piston-and-cylinder unit 47, together with the sleeve, can be displaced in the conventional manner relative to the spindle stock, in the direction of the spindle axis, for the purpose of introducing or removing the standardized taper of the tool holder into or from the likewise standardized holding fixture of the spindle stock.

The plate 34 on which the gripper arm 25 is pivoted, is provided at its upper end with a rod 68 extending vertically upwardly.

Similarly, the gripper arm 26 carrying the plate 54 is provided with a rod 69 extending in parallel to the rod 68.

The rods 68 and 69 are seated in the spindle stock 12 so that they are fixed in the axial direction but allowed to pivot about their longitudinal axes.

The rod 69 is provided at its upper end with an element 72 which is bent off from the rod substantially perpendicularly relative to the longitudinal axis of the rod, in the direction toward the observer—as viewed in the representation of FIG. 3—(see also FIG. 4), and which carries a roller 73 on its outer forward end.

The roller 73 is guided in a groove 75 in the cam element 40, and the projecting element 72 is fixed to the rod 69. The design of the groove 75 is such that it exhibits a cam contour bulging to the right, as viewed in the top view of FIG. 3.

Similarly, the rod 68 is provided with a projecting element 70 carrying on its outer end a roller 71. The roller 71 is guided in a groove 74 in the cam element 40, which is curved in the same, but mirror-symmetrical manner as the groove 75, relative to the spindle axis 23.

When the piston rods 46 or 66 of the piston-and-cylinder units 47 or 67, respectively, are extended so as to push the cam element 40 downwardly from the position illustrated in FIG. 3, the rollers 71 and 73, respectively, run along the grooves 74 or 75, respectively.

Figure 4:
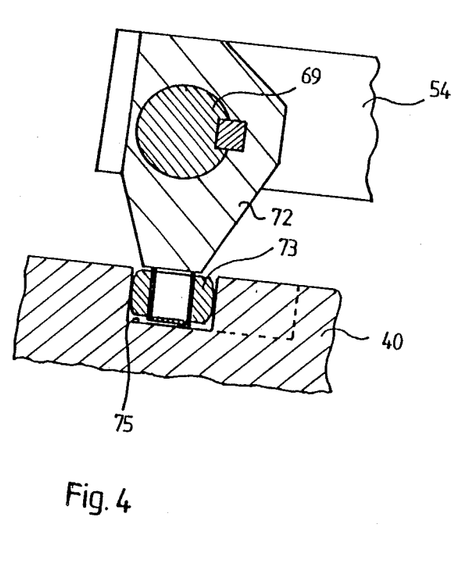
FIG. 4 shows a sectional view taken along line IV-IV in FIG. 3.

As can be seen best in FIG. 4, which shows the roller 73 in the position corresponding to that of FIG. 3, the roller 73 will initially, during downwardly movement of the cam element 40, run along the straight portion of the groove 75 without the rod 69 being pivoted.

Figure 5:
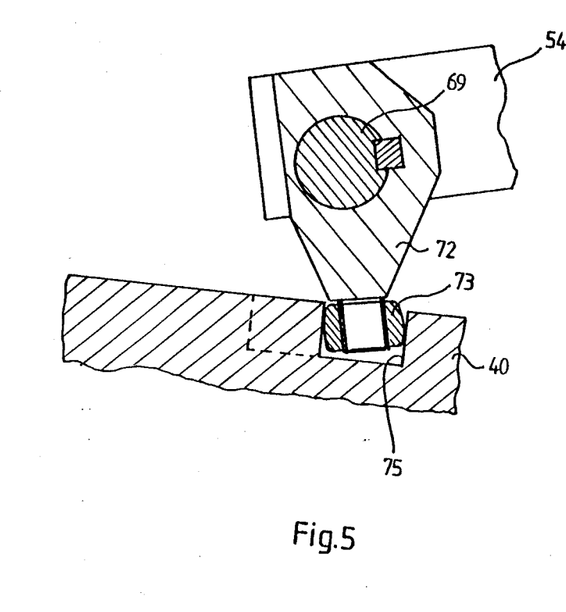
FIG. 5 shows a representation corresponding to the sectional view of FIG. 4, but with a swinging element of the machine tool of FIG. 1 in pivoted condition.

Once the cam element 40 has been pushed down to the point where the roller enters the portion of the groove 75 which is bent off to the right, the roller is guided to the right—as illustrated in FIG. 5—and the rod 69, which is rigidly connected to it, is pivoted in counterclockwise direction.

This pivoting movement causes the plate 54, which is rigidly connected to the lower end of the rod 69, to pivot in the same direction.

Given the fact that the groove 74 opposite the groove 75 exhibits a mirror-symmetrical contour, the rod 68 is pivoted in clockwise direction.

From the above it follows that the two gripper arms 25 and 26 are pivoted in opposite directions, viewed in the direction of the longitudinal axes of the rods 68 and 69. As the cam element 40 is displaced in downward direction, the gripper arms 25 and 26 are also pivoted simultaneously but in opposite directions, via the rods 39 and 59, about their pivot points on the plates 34 and 54, respectively. During downward movement of the cam element 40 from the position shown in FIG. 3 the gripper arm 25 is pivoted in counterclockwise direction, while the gripper arm 26 is pivoted in clockwise direction, and consequently the tool holders 37 and 57 move towards each other.

The pivoting movement of the gripper arm 25 is adjusted in such a manner that the tool holder 37 is transferred exactly from the end position illustrated in FIG. 3, i.e. the so-called pick-up and/or mounting position, to the spindle position which is occupied by the tool holder 57 in the representation of FIG. 3.

At same time, the tool holder 57 is to be transferred, by a pivoting movement of the gripper arm 26, from the spindle position exactly to the position which in FIG. 3 is occupied by the tool holder 37. This end position, in which the tool holders 37 and 57 occupy exactly the reverse positions, is illustrated in FIG. 6.

Figure 6:
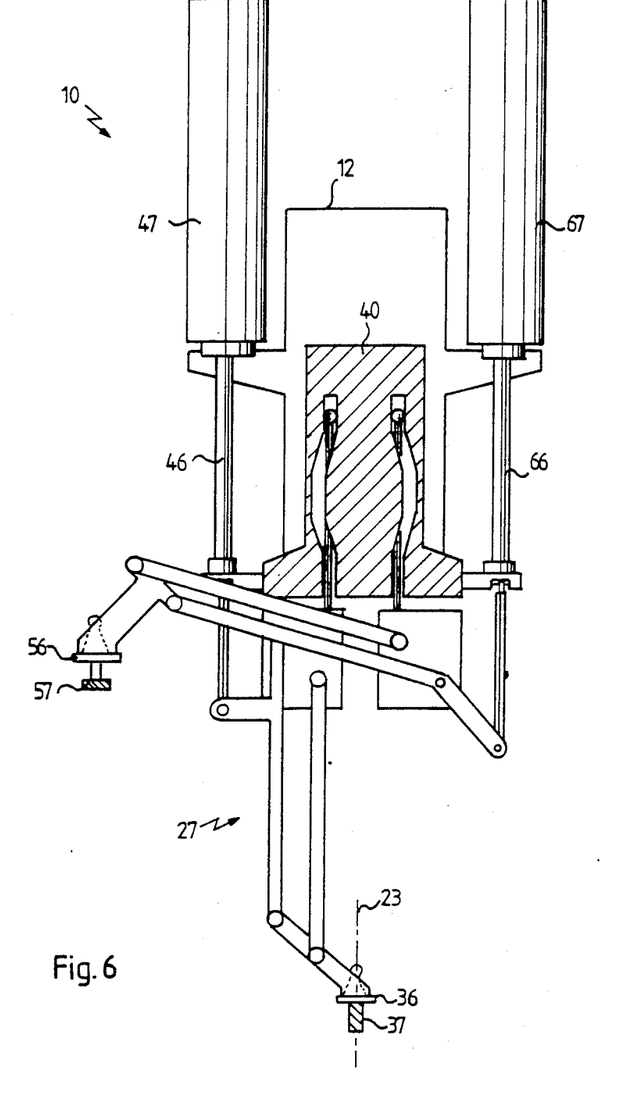
FIG. 6 shows a representation corresponding to that of FIG. 3, but illustrating a different operating position of a tool-changing device of the machine according to FIG. 1.

The diagrammatic representations of FIGS. 7 to 12 are meant to explain once more the motion sequence between the end positions of the pivoting gripper arms 25 and 26 as represented in FIGS. 3 and 6.

Figure 7:
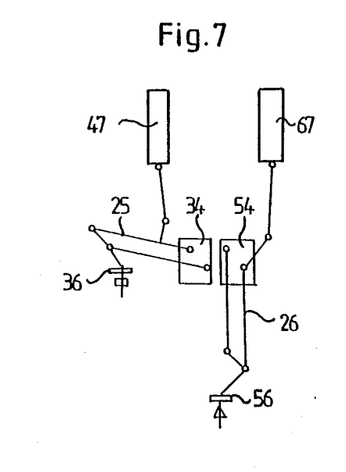
FIG. 7 is a very diagrammatic representation illustrating a first operating position, corresponding to that of FIG. 3, of a tool-changing device of the machine tool according to FIG. 1.
Figure 8:
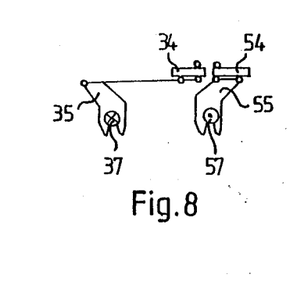
FIG. 8 is a top view of the tool-changing device according to FIG. 7.

FIG. 7 corresponds to the representation of FIG. 3, while FIG. 8 shows a top view of the first pair of gripper arms 27.

Figure 11:
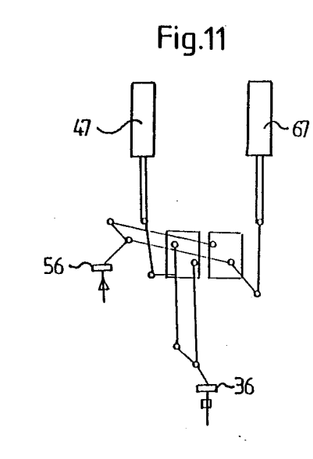
FIG. 11 shows a second opeating position of the tool-changing device of FIG. 7, corresponding to the illustration of FIG. 6.
Figure 12:
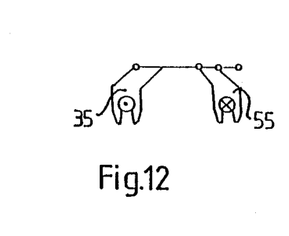
FIG. 12 shows a top view of the tool-changing device of FIG. 11.

FIG. 11 corresponds to the representation of FIG. 6, while FIG. 12 shows again a top view.

Figure 9:
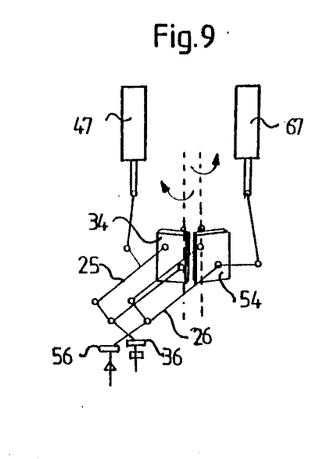
FIG. 9 shows the tool-changing device of FIG. 7 in a transitory position.
Figure 10:
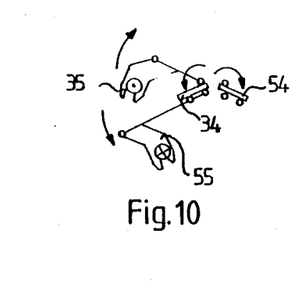
FIG. 10 shows a top view of the tool-changing device according to FIG. 9.

FIG. 9 corresponds to a transitory position in which the cam element 40 has been displaced downwardly from the position shown in FIG. 3 to a point where the rollers 71 and 73, respectively, occupy their maximally deflected position, i.e. at a point in the cam element 40 where the grooves are spaced apart the greatest distance, measured in transverse direction.

As will be seen best in FIG. 8, the plates 34 and 54 extend in one plane in one end position of the first pair of gripper arms 27. The gripper 35 holds the tool holder 37 in such a way that the tool is located in this position at about the level of the plate 34. The gripper 55 holds the tool holder 57 in such a way that it occupies its position in the spindle head and operates at a lower level.

As the cam element 40 is lowered from its position illustrated in FIG. 3, the rods 39 and 59 cause the arms 25 and 26, respectively, to pivot in opposite senses, whereby the tool holders 37 and 57 are caused to move toward each other. As soon as the rollers 71, 73 are deflected laterally by the grooves 74, 75, the plates 34 and 54, respectively, are pivoted in opposite senses about vertical axes via the rods 68, 69. The amount of deflection reaches its maximum in the area where the tool holders 36, 56 are positioned at the same level, i.e. in the area where they have to be moved past each other. From FIG. 10 it appears that the pivoting movements of the plates 34 and 54 ensure that the grippers 35 and 55, respectively, are permitted to pass each other in the vertical direction. Once the position illustrated in FIGS. 9 and 10 has been passed, the plates 34 and 54 are pivoted in the opposite direction, but again in opposite senses. This is achieved by the fact that the rollers 71 and 73 move along the upper, approaching portions of the grooves 74 and 75, respectively, which can be seen best in FIG. 3. In the end position illustrated in FIGS. 6, 11 and 12, the cam element 40 has been moved downward by the maximum length, the tool holder 57 occupies its pick-up and/or mounting position, while the tool holder 37 occupies the spindle position.

The tool holder 37 has moved along a curved path extending obliquely from the top to the bottom and rising in a direction away from the spindle stock 12. At the same time, the tool holder 57 has moved along a curved path extending obliquely from the bottom to the top and toward the spindle stock 12.

The contour of the grooves 74 and 75 illustrated in FIGS. 3 and 6 can be adapted to fit the particular design of the grippers 35 and 55 and may also be given a smooth curved shape in order to avoid jerky pivoting movements.

The explanations given above in connection with FIGS 3 to 12 apply by analogy also to the second pair of gripper arms 30 arranged at the right side of the axis 18, as viewed in FIG. 1.

In the illustration of FIG. 1, the second pair of gripper arms 30 occupies a position corresponding to the extended position of the piston-and-cylinder unit as shown in FIG. 6.

However, the pairs of gripper arms 27 and 30 illustrated in FIG. 1 may of course also be arranged in such a way that their respective piston-and-cylinder units operate in the same senses.

However, when using the operating mode illustrated in FIG. 1, it is possible to couple the piston-and-cylinder units operating the first pair of gripper arms 27 with piston-and-cylinder units operating the second pair of gripper arms 30 in such a way that the pressure agent needed for extending the piston rods of the one unit is derived from the piston-and-cylinder unit or units of the other side, where the piston rods are then retracted.

For supplying the two pairs of gripper arms 27 and 30 with tool holders, each pair has assigned to it a T-shaped endless track 81, 82, the two tracks being received in a common magazine housing 80 of the magazine 20. This arrangement can be seen best in FIG. 13.

According to the representations of FIGS. 1 and 2, the vertical portion of the T of the endless track 81 extends at the left of the spindle stock 12, whereas the corresponding portion of the endless track 82 extends at the right of the spindle stock 12.

Figure 13:
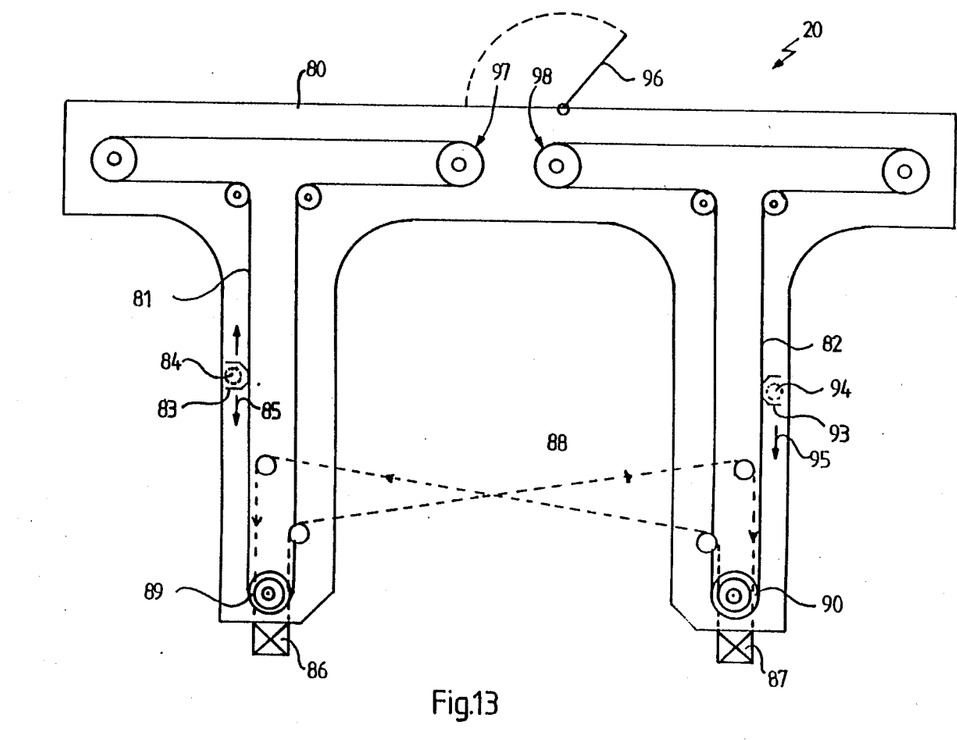
FIG. 13 shows an enlarged, very diagrammatic representation of a tool magazine of the machine tool according to FIGS. 1 and 2.

The transverse portions of the Ts are arranged at the rear of the spindle stock 12 and aligned with each other. The two endless tracks 81 and 82 are located in a plane extending perpendicularly to the main spindle axis 18. The endless track 81 is provided at its outer periphery with a plurality of grippers 83—of which only one is illustrated in FIG. 13—for receiving one tool holder 84 each.

Similarly, the endless track 82 is equipped with grippers 93 for receiving tool holders 94. At each of the forward ends of the vertical T portions of the endless tracks 81 and 82 one can see a pick-up and mounting station 86, 87. The pick-up and mounting station 86 serves the first pair of gripper arms 27, whereas the pick-up and mounting station 87 serves and second pair of gripper arms 30.

A guide roller 89 of the first endless track 81, which is designed at drive roller, is connected to the corresponding, mirror-symmetrical guide roller 90 of the endless track 82, via a belt element 88 which is crossed only once. Consequently, when the roller 89 is moved in counterclockwise direction, the tool 84 present on the left outer side, on the endless track 81, is moved toward the pick-up and/or mounting position 86. As the path to the roller 90 is crossed only once, a tool 94 present on the right side of the endless track 82, in mirror-symmetrical arrangement, is similarly moved the same length toward the pick-up and mounting station 87. If, therefore, the two T-shaped endless tracks 81 and 82 are equipped in mirror-symmetrical manner, the coupled arrangement makes it possible to supply both pick-up and mounting stations 86 and 87 with identical tools synchronously, by means of a single drive.

This leads to the result that the two pairs of gripper arms 27 and 30 also transfer identical tool holders from the magazine to the spindle position or back, which means that two identical workpieces can be worked simultaneously with two identical tools.

It has become possible in this manner to double the working capacity, compared with that of a single-spindle design.

The fact that the endless tracks 81 and 82 are driven in opposite senses further facilitates the operation of mounting the tool holders in the grippers 83 and 93. For, when a centrally arranged plate 96 is opened at the rear of the housing 80, the positions 97, 98 of the endless tracks 81, 82 which are rendered accessible are assigned to identical tool holders so that the latter can be mounted or picked up in pairs, which helps exclude errors.

Figure 14:
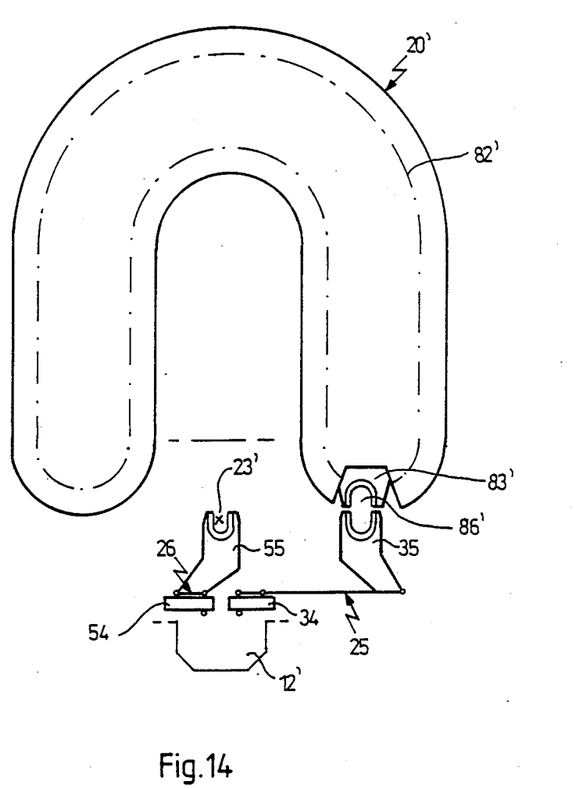
FIG. 14 shows another very diagrammatic top view of one embodiment of a machine tool using a horseshoe magazine.

Finally, FIG. 14 shows a diagrammatic top view of another embodiment of a machine tool according to the invention where the tool magazine 20' is designed in the way of a horseshoe magazine. Such a "horseshoe magazine" has been known before and has been described, for example, in full detail by DE-PS No. 35 21 009 to applicant. The disclosure content of this publication is incorporated herein by reference.

The horseshoe magazine 20' comprises a likewise horesshoe-shaped endless track 82' from or in which tool holders 83' can be mounted or picked up at a pick-up and-or mounting position 86'. Contrary to the known horseshoe magazine, as described by the before-mentioned DE-PS No. 35 21 009, the horseshoe magazine 20' has only one such position 86'.

For tool-changing purposes, the pair of gripper arms is again equipped with gripper arms 25, 26, as described before, the pair of gripper arms being arranged on the spindle stock 12' of the machine tool. The spindle axis 23' coincides, preferably, with the longitudinal center plane of the horseshoe magazine 20'.

This makes it possible, in the described manner, to transfer tool holders from the mounting fixture of the spindle to the tool magazine and back, by means of the grippers 35, 55.

We claim:
1. A machine tool comprising:
   a spindle stock having a receiving opening along a spindle axis for receiving tool holders therein;
   a toolholder magazine being arranged next to said spindle stock and being provided with storage cells for storing a plurality of toolholders, said magazine having an endless path conveyor for conveying said storage cells along said endless path and for stopping said conveyor when a predetermined storage cell is in an accessible transfer position of said magazine to remove a toolholder from said predetermined storage cell or to insert a toolholder into said predetermined storage cell, respectively, said transfer position being arranged on a first lateral side of said spindle stock distant from said spindle axis;
   a first transfer arm arranged pivotably on said first lateral side of said spindle stock, said first transfer arm being provided with a first gripper on a first free end to grip toolholders and transfer same between said receiving opening and said transfer position;
   a second transfer arm arranged pivotably on a second lateral side of said spindle stock opposite said first laternal side with respect to said spindle axis, said second transfer arm being provided with a second gripper on a first end to grip toolholders and transfer same between said receiving opening and said transfer position; and,
   drive means for pivoting said first and said second transfer arms simultaneously and oppositely directed to transfer in a first operational phase a first toolholder from said transfer position to said receiving opening with said first transfer arm while simultaneously transferring a second toolholder from said receiving opening to said transfer position with said second transfer arm, whereas, in a second operational phase a third toolholder is transferred from said receiving opening to said transfer position with said first transfer arm and, simultaneously, a fourth toolholder is transferred from said transfer position to said receiving opening with said second transfer arm, said transfer arms, hence, being pivoted asymmetrically and crossing each other during said first and said second operational phases with said first and second gripppers being displaced solely on said first lateral side of said spindle stock,

2. The machine tool of claim 1, having a first and a second spindle stock each being designed as said spindle stock, said first and second spindle stocks having each a pair of transfer arms designed as said first and second transfer arm, said first spindle stock having a first toolholder magazine and said second spindle stock having a second toolholder magazine, said first and second toolholder magazines having their transfer positions on opposite lateral sides thereof.

3. The machine tool according to claim 1, wherein each said transfer arm is pivoted, at a second free end on a swinging element of said spindle stock, each swinging element of said spindle stock being pivotable about an additional axis for allowing said transfer arms, when pivoted in opposite direction, to cross and pass each other past each other without getting into contact with each other.

4. The machine tool according to claim 3, wherein each transfer arm is pivoted on one swinging element of said spindle stock so as to be pivoted about an axis extending substantially perpendicularly to said spindle axis, said spindle axis and said additional axis extending in a vertical direction.

5. The machine tool according to claim 3, further comprising actuating means controlling the pivoting movement of said transfer arms, and, simultaneously, actuating said swinging element.

6. The machine tool according to claim 5, wherein said actuating means is connected with a cam element being displaceable up and down on said spindle stock along a vertical axis, said cam element cooperating with a pivoting element running along a groove in said cam element and being connected to said swinging element, such that any upward or downward movement of said cam element will cause said swinging elements via said pivoting elements to pivot in opposite directions, from a rest position to a maximum pivoted position and then back to said rest position.

7. The machine tool according to claim 6, wherein contours of said grooves are designed such that said maximum pivoted position of said swinging element corresponds to a position in which said toolholders gripped by said transfer arms move past each other.

8. The machine tool according to claim 6, wherein said swinging element is designed as a plate-shaped body with an arm pivoted on its outside, said body being provided with an outwardly projecting rod carrying on its outer end a protruding element which runs in said groove of said cam element thereby causing said rod to pivot about its longitudinal axis.

9. The machine tool according to claim 8, wherein said rod is held in said spindle stock in the area between said plate-shaped body and said protruding element, in axially fixed relationship, but permitted to pivot about its longitudinal axis.

10. The machine tool according to claim 6 wherein said cam element is connected with said first and said first and said second transfer arms via a first and a second rod, respectively, said rods being hinged in a two-dimensional joint on either side of said cam element, such that any movement of said cam element in one direction, between two vertical end positions, will cause said transfer arms to swing in opposite directions, between their end positions, said rods being caused to follow the pivoting movement of said swinging element.

11. The machine tool according to claim 10, wherein said one rod is hinged in a two-dimensional joint to said first transfer arm taking the form of a one-armed lever, at a point between a second free end and its first free end carrying said first gripper, while said other rod is hinged in a two-dimensional joint to an outer end of said second transfer arm, being designed as a two-armed lever, and carrying said second gripper at its second free end.

12. The machine tool according to claim 1, wherein each transfer arm is composed from bars forming a parallelogram.

13. The machine tool according to claim 5, wherein said actuating means is designed as a vertical-stroke piston-and-cylinder unit having an outer end of its piston rod connected with said cam element.

14. The machine tool according to claim 13, wherein said actuating means comprises two piston-and-cylinder units arranged symmetrically to said spindle axis, said cam element and, below the latter, said swinging elements to be pivoted being enclosed between said piston-and-cylinder units, said rods connected with said cam element extending likewise symmetrically to said spindle axis.

15. The machine tool according to claim 1, wherein said endless track of said toolholder magazine is designed in T-shape, said storage cells being displaceable in a horizontal plane and above said receiving opening, said transfer position being located at a lower end of said T.

16. The machine tool according to claim 2, wherein each spindle has assigned to it a toolholder magazine with a T-shaped endless track.

17. The machine tool according to claim 16, wherein the two endless tracks are operated via a single drive, by means of a belt element whose path crosses once.

18. The machine tool according to claim 16, wherein said T-shaped magazines adjoin each other behind said spindle stocks by opposite outer ends of transverse sections of said T's, said magazine being accommodated in one common magazine housing.

19. The machine tool according to claim 1, wherein said endless track of said toolholder magazine is designed in horseshoe shape, said transfer position being located at a free end of one leg of said horseshoe.

* * * * *